(12) United States Patent
Weinstein

(10) Patent No.: US 11,284,626 B2
(45) Date of Patent: Mar. 29, 2022

(54) METHOD AND APPARATUS FOR CRIMPING AND CUTTING POUCHED DOUGH PRODUCTS

(71) Applicant: General Mills, Inc., Minneapolis, MN (US)

(72) Inventor: James Weinstein, Maple Grove, MN (US)

(73) Assignee: General Mills, Inc., Minneapolis, MN (US)

( * ) Notice: Subject to any disclaimer, the term of this patent is extended or adjusted under 35 U.S.C. 154(b) by 557 days.

(21) Appl. No.: 16/073,176

(22) PCT Filed: Mar. 14, 2016

(86) PCT No.: PCT/US2016/022281
§ 371 (c)(1),
(2) Date: Jul. 26, 2018

(87) PCT Pub. No.: WO2017/160267
PCT Pub. Date: Sep. 21, 2017

(65) Prior Publication Data
US 2019/0037858 A1    Feb. 7, 2019

(51) Int. Cl.
*A21C 9/06*    (2006.01)
*A21C 11/04*   (2006.01)
(Continued)

(52) U.S. Cl.
CPC ............... *A21C 9/061* (2013.01); *A21C 9/06* (2013.01); *A21C 11/04* (2013.01); *A21C 11/10* (2013.01);
(Continued)

(58) Field of Classification Search
CPC ....... A21C 9/061; A21C 11/163; A21C 11/22; A21C 11/04; A21C 11/10; A21C 11/08; A21C 7/06
(Continued)

(56) References Cited

U.S. PATENT DOCUMENTS 1,945,755 A    2/1934  Scruggs, Jr.
3,302,592 A *  2/1967  Werner ................. A21C 11/08
                                                   425/471

(Continued)

FOREIGN PATENT DOCUMENTS

DE    2340025    2/1974
EP    0841009    5/1998

*Primary Examiner* — Erik Kashnikow
*Assistant Examiner* — Lela S. Williams
(74) *Attorney, Agent, or Firm* — Diederiks & Whitelaw, PLC; Annette M. Frawley, Esq.

(57) ABSTRACT

A crimping and cutting assembly includes a first roller engaged with a second roller including a honeycomb pattern of polygonal crimping and cutting members. Various transversely spaced, internally filled dough ropes are fed between the first and second rollers, causing each rope to be continuously crimped and cut at longitudinally spaced locations to create multi-sided food products, specifically polygonal food products having two to six crimped and cut sides. The ropes can permissibly shift or wander laterally during production, resulting in slightly different size or shape food products, while the honeycomb pattern acts to re-align the ropes so as to be tolerant to the ropes wandering while still preventing puncturing of the ropes which could lead to loss of filling and extended production downtime.

19 Claims, 4 Drawing Sheets

(51) Int. Cl.
*A21C 11/10* (2006.01)
*A23P 30/25* (2016.01)
*A21C 11/16* (2006.01)

(52) U.S. Cl.
CPC .............. *A23P 30/25* (2016.08); *A21C 9/066* (2013.01); *A21C 11/163* (2013.01)

(58) Field of Classification Search
USPC .................. 425/299, 298, 296; 264/157, 163
See application file for complete search history.

(56) References Cited

U.S. PATENT DOCUMENTS

| | | | |
|---|---|---|---|
| 3,427,910 A | 2/1969 | Zempel | |
| 3,599,579 A | 8/1971 | Paaskesen | |
| 3,603,270 A | 9/1971 | Tangel | |
| 3,872,757 A | 3/1975 | Hargadon | |
| 4,276,800 A | 7/1981 | Koppa et al. | |
| 4,381,906 A | 5/1983 | Mancini | |
| 4,382,768 A | 5/1983 | Lifshitz et al. | |
| 4,511,586 A | 4/1985 | Fitzwater et al. | |
| 4,574,690 A | 3/1986 | Chiao et al. | |
| 4,647,468 A | 3/1987 | Pinto | |
| 4,671,759 A | 6/1987 | Hayashi et al. | |
| 4,689,236 A | 8/1987 | Pinto | |
| 5,037,350 A | 8/1991 | Richardson et al. | |
| 5,198,257 A * | 3/1993 | Heck | A21C 11/04 425/133.1 |
| 5,342,188 A | 8/1994 | Zimmermann | |
| 5,388,489 A | 2/1995 | Dayley | |
| 5,498,433 A | 3/1996 | Ouellette | |
| 5,529,799 A * | 6/1996 | Bornhorst | A21C 11/04 264/153 |
| 5,687,638 A | 11/1997 | Makowecki | |
| 5,750,170 A | 5/1998 | Daouse et al. | |
| 6,004,612 A | 12/1999 | Andreski et al. | |
| 6,117,472 A | 9/2000 | Yonemaru et al. | |
| 6,168,817 B1 | 1/2001 | Pavan | |
| 6,217,309 B1 * | 4/2001 | Jens | B65B 25/06 425/235 |
| 6,530,771 B1 | 3/2003 | Clark | |
| 6,612,825 B2 | 9/2003 | Warner | |
| 7,316,556 B2 | 1/2008 | Maniak et al. | |
| 8,535,039 B2 * | 9/2013 | Evans | A21C 3/10 425/316 |
| 2015/0351434 A1 | 12/2015 | Fase, Jr. et al. | |
| 2016/0286824 A1 * | 10/2016 | Stenvik | A21C 11/16 |

* cited by examiner

METHOD AND APPARATUS FOR CRIMPING AND CUTTING POUCHED DOUGH PRODUCTS

CROSS REFERENCE TO RELATED APPLICATIONS

This application represents a National Stage application of PCT/US2016/022281 filed Mar. 14, 2016 and titled "Method and Apparatus for Crimping and Cutting Pouched Dough Products". The entire content of this application is incorporated by reference.

FIELD OF THE INVENTION

The invention generally pertains to the art of food making and, more particularly, to a method and apparatus for crimping and cutting pouched dough products.

BACKGROUND OF THE INVENTION

It is known in the food art to form dough products, such as various pastries, with internal pouches containing filling material. These types of food products are typically manufactured in one of two ways. The first form includes at least filling, folding and cutting operations. In general, a filling material is applied to sections of dough sheets, the sections are cut and folded onto themselves, and then the folded sections are crimped along exposed edge portions to form individual pouched dough products. In an alternative form, the dough sections are filled after the folding operation, with a final crimping operation being performed to seal an opening to the pouch. Another known manufacturing form includes co-extruding an outer dough material with an internal filling material. Although a corresponding folding operation is avoided, in a fashion similar to that described above, this production arrangement employs a related crimping operation, followed by a cutting operation, in forming the final products.

In the food industry, it is known to utilize a guillotine for cross-cutting purposes. In connection with a dough product which also needs to be crimped, successive crimping and cutting units are often arranged along a production line to carry out these operations. However, it is also possible to employ a combination crimping and cutting system. In one known form, a vertically shiftable, combination crimping and cutting element is employed, with the combination crimping and cutting element having a blunt edge portion used to crimp peripheral portions of a food product while a sharpened edge of the crimping and cutting element simultaneously performs the cutting operation in the fashion of a guillotine. Another known arrangement employs a crimping and cutting assembly in the form of a pair of roller wheels which cooperate to crimp and cut an internally filled dough rope to form shaped food products.

At least in the mass production of such food products, these crimping and cutting arrangements can present certain manufacturing problems. In particular, it is highly desirable to not only maintain the dough product moving in a continuous production operation, but also to employ a reasonably high conveyor speed for the product. However, in the connection with the guillotine arrangements, since the guillotine acting arrangement only shifts vertically, even with an increase in the vertical travel speed of the guillotine unit, design practicalities mandate that the horizontal travel speed of the product be lowered or, at a minimum, the thickness of the product reduced. Otherwise, issues such as bunching, poor crimping and incomplete cutting of the product can arise. The dual roller arrangement is considered to be an improvement over the guillotine unit, particularly in operational speed. However, the ropes have been known to routinely break or slice during operation, causing leaking of the inner filling material. When this occurs, the entire operation must be discontinued and the rollers thoroughly cleaned before production can resume.

With the above in mind, it is desired to provide a method and apparatus for crimping and cutting dough products wherein both the crimping and the cutting operations are effectively performed in the making of pouched dough products in a high speed manufacturing setting, while also avoiding detrimental damage to the ropes being crimped and cut so as to enable a continuous, effective and efficient product operation.

SUMMARY OF THE INVENTION

The present invention is concerned with crimping and cutting a dough product in connection with the making of various food products including filling material. In particular, the invention is directed to a combination crimping and cutting assembly employed to crimp and cut one or more continuous, extruded ropes, formed with an outer dough casing and an internal filling material, into polygonal-shaped snack food products at a high rate of speed.

In accordance with a preferred embodiment of the invention, various laterally spaced, internally filled dough ropes are fed to a crimp/cutter assembly having first and second abutting rollers, with one of the rollers including a honeycomb pattern of polygonal crimper/cutter members. Each rope is crimped and cut in at least two longitudinally spaced locations to create a multi-sided food product, specifically a polygonal food product having between two and six crimped sides. In accordance with one preferred embodiment, the first roller constitutes a smooth roller, while the second roller is provided with the combination crimper and cutter members, with adjacent crimpers/cutters on the second roller being partially, laterally overlapped to establish a honeycomb pattern about the second roller. Although various polygonal shapes can be employed, hexagonal shaped crimping and cutting members are preferred. In any case, the width of each rope is less than a transverse dimension of the crimping and cutting members. With this arrangement, the ropes are permitted to shift or wander laterally during production, resulting in the continuous formation of slightly different sized and shaped, internally filled and sealed food products having between two and six crimped and cut sides. However, the honeycomb pattern tends to re-align the ropes so as to be tolerant to the rope wandering while still preventing puncturing of the ropes which could lead to loss of filling and extended production downtime of the system.

Additional objects, features and advantages of the invention will become more readily apparent from the following description of preferred embodiments of the invention when taken in conjunction with the drawings wherein like reference numerals refer to corresponding parts in the several views.

DETAILED DESCRIPTION OF THE INVENTION

Figure 1:
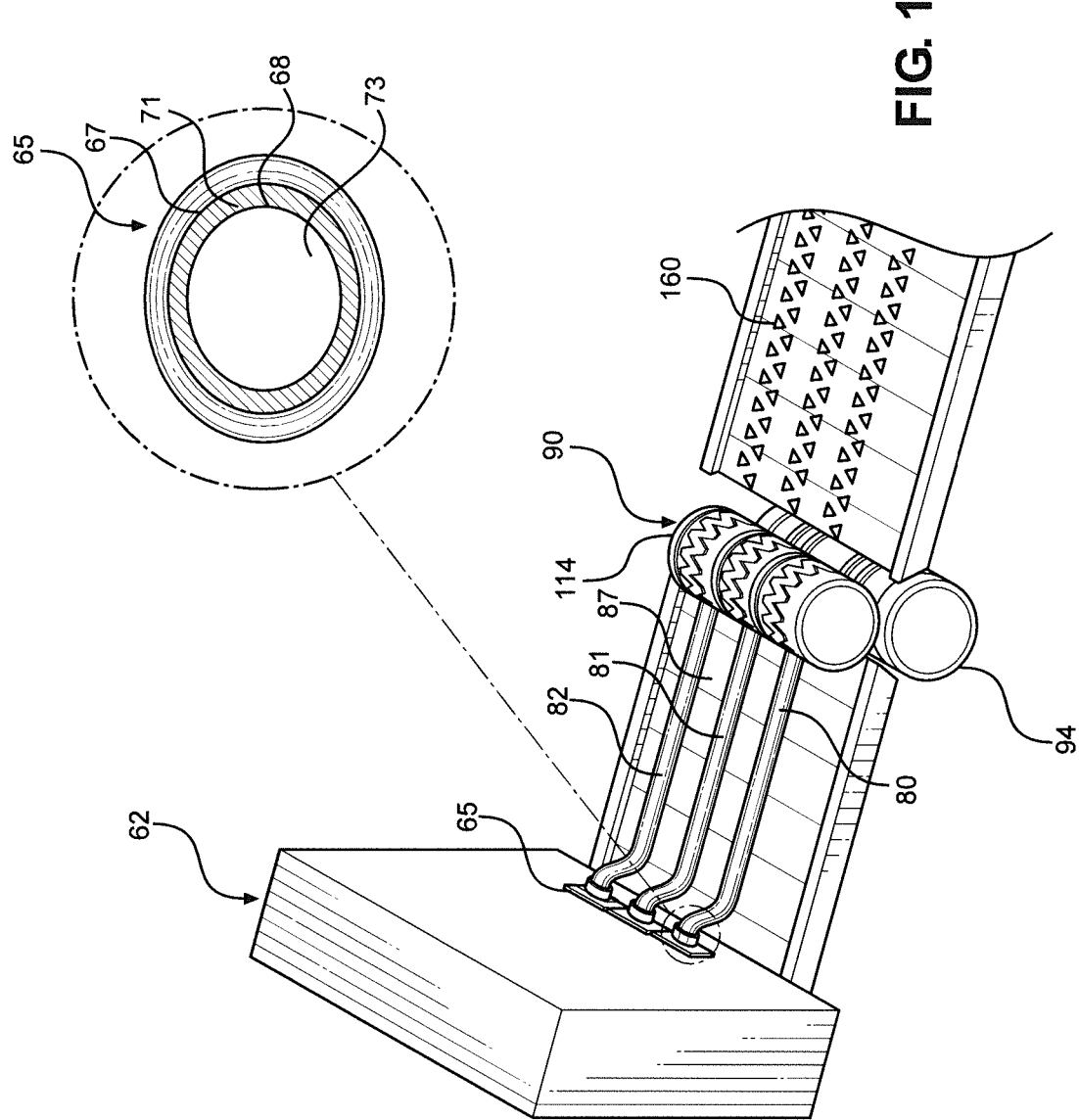
FIG. 1 is a perspective view of a portion of a manufacturing line for dough products with filling material employing a dough crimping and cutting apparatus constructed in accordance with an initially contemplated arrangement.
Figure 2:
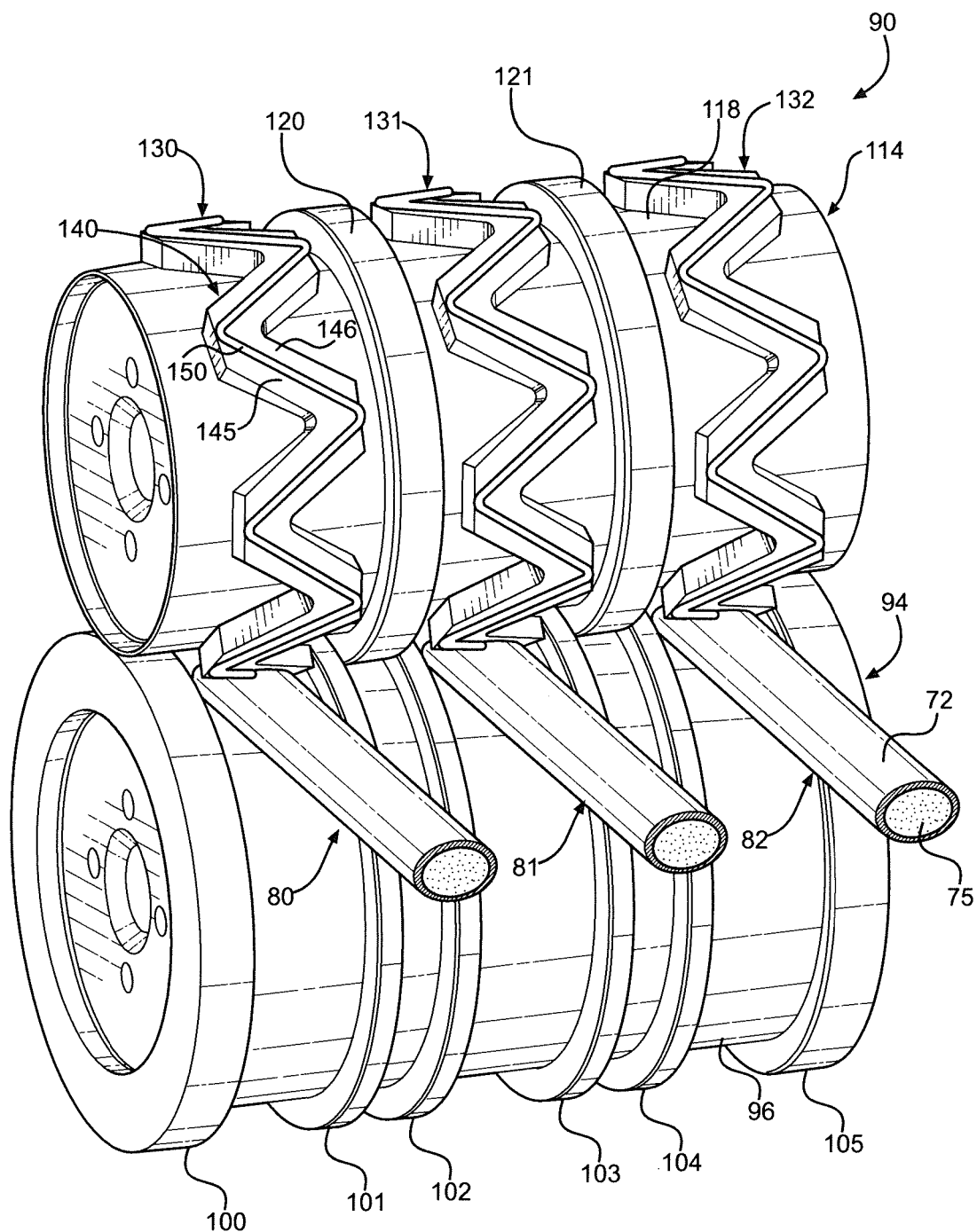
FIG. 2 is a perspective view of the prior art crimping and cutting apparatus of FIG. 1.

As indicated above, FIGS. 1 and 2 illustrate an initially contemplated crimping and cutting arrangement. This arrangement utilized a multi-row extruder 62 having a plurality of laterally spaced heads, one of which is indicated at 65. As shown in the enlarged view, each head 65 includes an outer channel defining member 67 and a concentric, inner channel defining member 68 establishing an outer die port 71 and a central die port 73. Flowing through outer die port 71 is an outer dough material 72 (which can be either cooked or uncooked so long as sealable with pressure), while a filling material 75 simultaneously flows through central die port 73. With the arrangement shown, extruder 62 forms a plurality of elongated, laterally spaced rows, exemplified by rows, of food product which are deposited, in the form of continuous ropes 80-82, onto a common conveyor 87.

Downstream of extruder 62 is provided the combination crimping and cutting assembly which is generally indicated at 90 extending across conveyor 87. Combination crimping and cutting assembly 90 includes a first roller 94 having an outer surface 96 from which project a plurality of laterally spaced, annular guide rails 100-105. Of these, rails 100 and 105 constitute outermost rails, while rails 101-104 are laterally spaced between rails 100 and 105. More specifically, ropes 80-82 are arranged between rails 100 and 101, 102 and 103, and 104 and 105 respectively, to limit lateral shifting of ropes 80-82. Combination crimping and cutting assembly 90 also includes a second roller 114 having an outer surface 118 from which project spaced alignment rails 120 and 121 and spaced crimping and cutting members 130-132. As shown, alignment rails 120 and 121 are disposed between rails 101 and 102, and 103 and 104, respectively, to prevent relative lateral shifting between first and second rollers 94 and 114.

Each crimping and cutting member 130-132 takes a zig-zagging form, with each section defined by a raised section 140 including annularly spaced crimping edge portions 145 and 146, as well as an intermediately disposed, cutting bead 150 extending continuously about second roller 114. With this arrangement, each rope 80-82 passing between rollers 94 and 114 will be continually crimped by edge portions 145 and 146, as well as cut by bead 150, in forming individual, generally triangular-shaped filled dough products 160.

Although the crimping and cutting assembly 90 of FIGS. 1 and 2 was successfully employed to produce the triangular-shaped filled dough products 160, there were noticeable drawbacks. In particular, the size of the ropes 80-82 had to be quite precise in relation to the exact construction of the crimping and cutting members 130-132, otherwise the system experienced issues similar to the known prior art discussed above wherein one or more of ropes 80-82 would be damaged to the point where some of the filling material 75 would leak, thereby requiring the overall system to be shut down for cleaning purposes. In addition, product design was limited in that a single shape was associated with each configuration of the crimping and cutting members 130-132. Therefore, if a different shaped food product was desired, crimping and cutting members 130-132 would need to be replaced by differently configured crimping and cutting members, again resulting in undesired production downtime.

Figure 3:
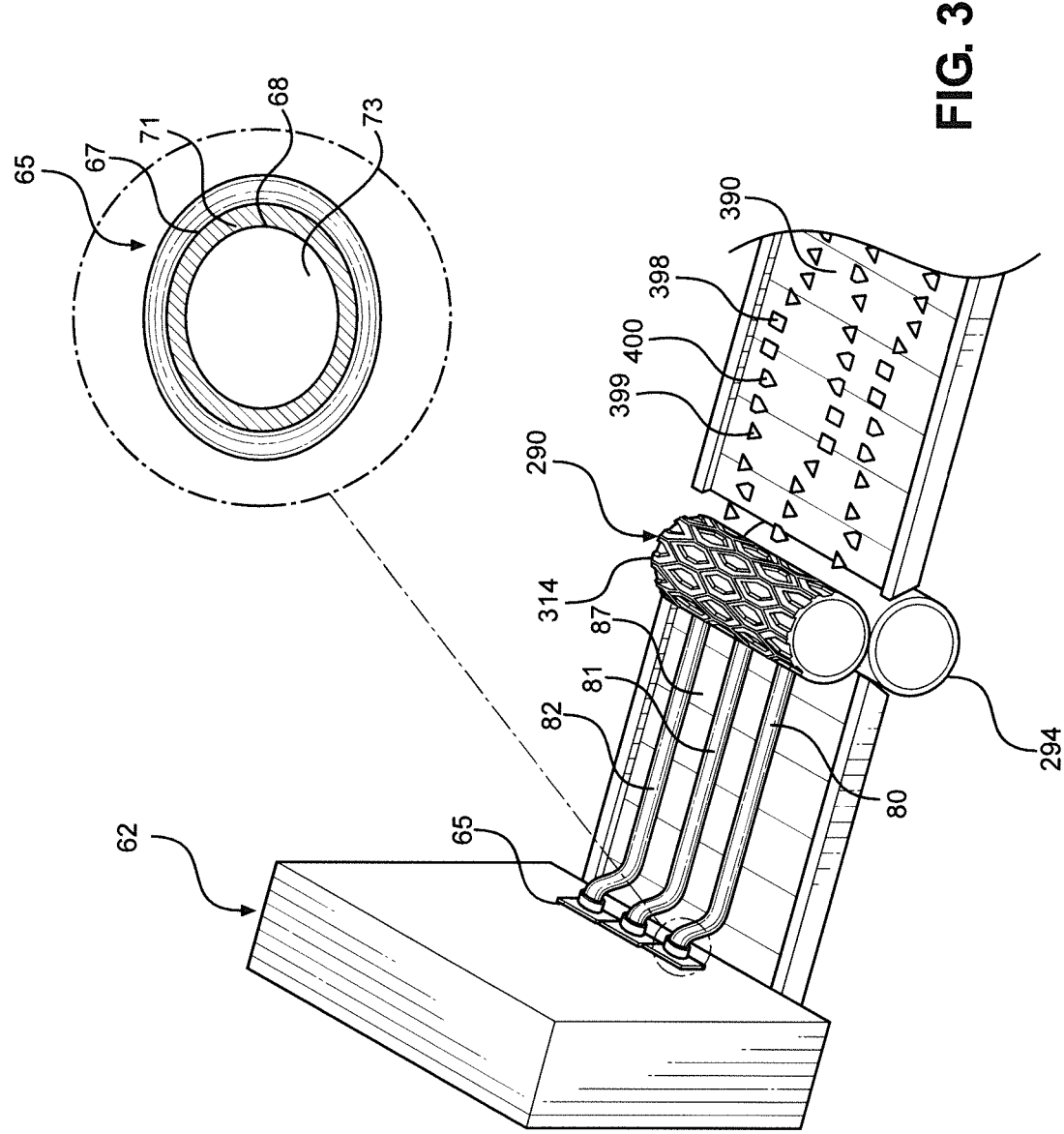
FIG. 3 is a perspective view of a portion of a manufacturing line for dough products with filling material employing a dough crimping and cutting apparatus constructed in accordance with the present invention.
Figure 4:
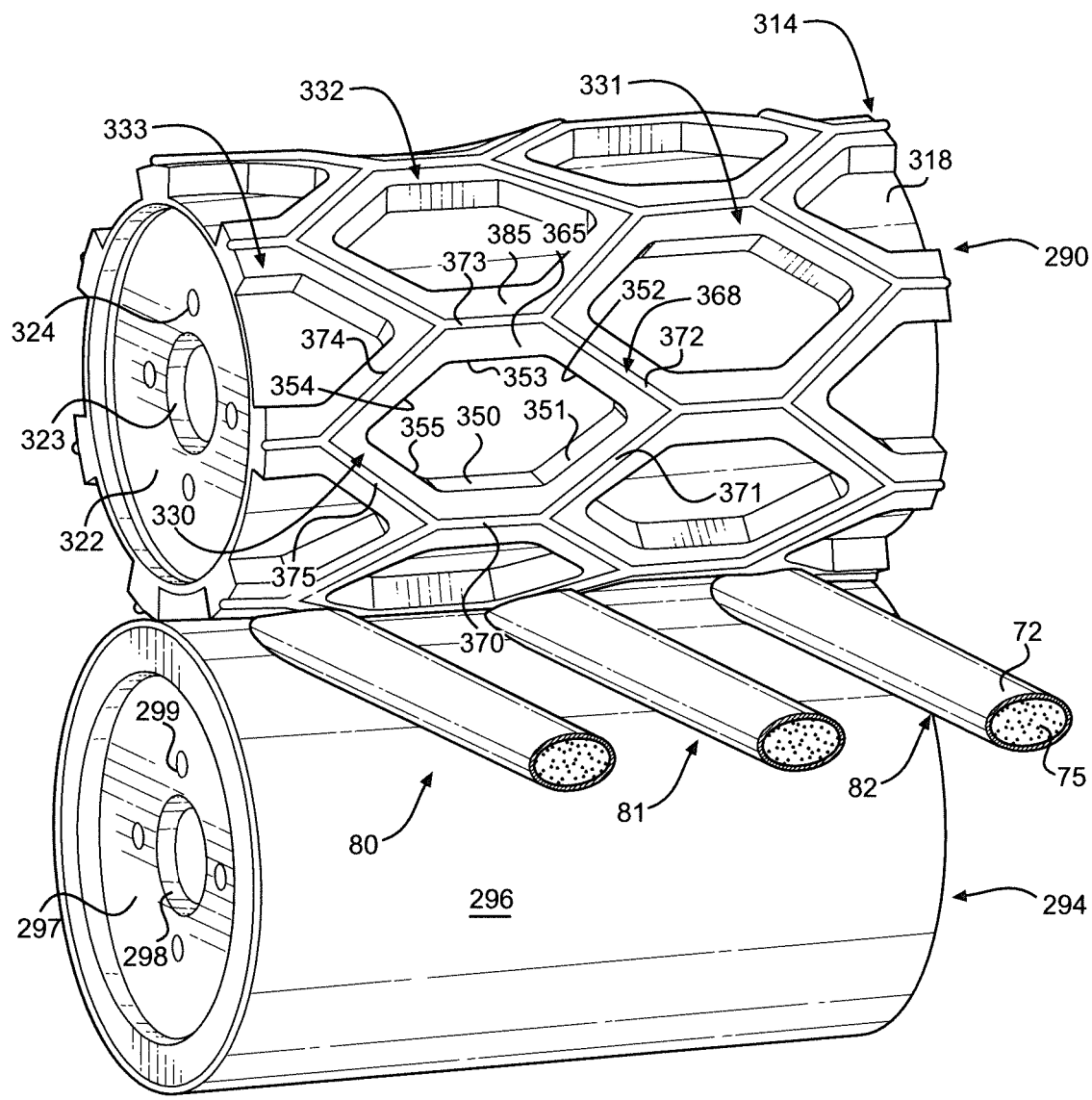
FIG. 4 is an enlarged perspective view of the crimping and cutting apparatus of FIG. 3.

Further advancement in the overall invention resulted in modifications which effectively address the perceived drawbacks of the arrangement of FIGS. 1 and 2. With reference to FIGS. 3 and 4, it should first be noted that various structural elements correspond to those shown and described in connection with FIG. 1 such than common reference numerals have been employed here and the details of this structure will not be reiterated. Instead, in accordance with this preferred embodiment, a combination crimping and cutting assembly generally indicated at 290 is employed for crimping and cutting ropes 80-82. As best shown in FIG. 4, crimping and cutting assembly 290 includes a first roller 294 having an outer surface 296 which is smooth so as to not include guide rails for each rope 80-82. Outer surface 296 can be hard or soft, such as having a plastic or elastomeric outermost layer. First roller 294 is shown to include a hub 297 provided with a central opening 298 and a plurality of mounting holes 299 for receiving and securing shaft, such as a motor driven drive shaft (not shown) for rotating roller 294 during product manufacturing. Crimping and cutting assembly 290 also includes a second roller 314 having an outer surface 318 and a hub 322 which is also provided with a central opening 323 and a plurality of mounting holes 324 for receiving and securing a motor driven drive shaft (not shown) for rotating roller 314 during product manufacturing.

Extending from outer surface 118 of second roller 314 are a plurality of crimping and cutting members, as represented by crimping and cutting members 330-333. By way of example, crimping and cutting member 330 includes a plurality of interconnected, upstanding walls 350-355 which lead to a common upper ledge or surface 365. Projecting from upper ledge 365 is a cutting element in the form of a bead 168 which extends entirely about a respective crimping and cutting member 330-333. In the preferred embodiment shown, various crimping and cutting members 330-332 are hexagonal in shape as established by upstanding walls 350-355 for crimping and cutting member 330. Correspondingly, bead 168 includes sections 370-375 raised above upper ledge 365 and extending above upstanding walls 350-355 respectively. As should be readily apparent from FIG. 4, bead 168 is common to multiple, adjacent crimping and cutting members. The same can be said for each upper ledge. For instance, upper ledge 365 at upstanding wall 353 extends between crimping and cutting members 330 and 332, while bead section 373 is common to both of crimping and cutting members 330 and 332. Overall, the preferred embodiment depicted has a hexagonal honeycomb pattern established by the various crimping and cutting members mainly arranged in a closed cell pattern about the external surface 318 of the second roller 314.

Referencing rope 81 by way of example, during operation, rope 81 will be directed between first and second rollers 294 and 314 in the region of crimping and cutting members 330 and 332. Since there are no guide rails on first roller 294, rope 81 may have a tendency to wander or laterally shift relative to ropes 80 and 82, as well as relative to the various portions of crimping and cutting members 330 and 332. As should be evident from at least the scale depicted in FIG. 4, rope 81 is shown to have an outer dimension in the order of ⅓ of the greatest lateral extent of either of crimping and cutting members 330 and 332. Therefore, rope 81 may come into contact with any number of portions of crimping and cutting member 330 or 332. For instance, rope 81 may first become engaged with upper ledge 365 and bead 368 at upstanding wall 351 and bead section 371; rope 81 may first become engaged with upper ledge 365 and bead 368 at upstanding wall 350 and bead section 370; rope 81 may first become engaged with upper ledge 365 and bead 368 at upstanding wall 355 and bead section 375; or even between these various sections. In any case, rope 81 will initially engage upper ledge 365 between first and second rollers 294 and 314, then rope 81 will engage a particular bead section 370, 371, 375 or combination of bead sections 370, 371 or 370, 375. These engagements will cause rope 81 to be crimped, thereby sealing in filling material 75 with a portion of outer dough casing 72, and cut. Continued delivery of rope 81 between rollers 294 and 314 will cause rope 81 to be again crimped and cut at a longitudinally spaced location, thereby resulting in a sealed pouched food product which will initially be housed between upstanding walls 350 and 353 and then will be ejected onto a downstream conveyor 390. Depending on the positioning of rope 81 relative to crimping and cutting member 330, the resulting product will vary in size and shape, such as represented by the various differently sized and different polygonal-shaped, internally filled dough products, such as represented with resulting food products 398-400 shown in FIG. 3. With each rope 80-82 having an outer dimension in the order of ⅓ of the greatest lateral extent of either of crimping and cutting members 330 and 332, each food product can have between two and four crimped sides. However, the outer diametric dimension of each rope 80-82 could also be greater than the length of either upstanding wall 350 or 353 which could result in a food product having up to six crimped sides while still enabling the desired wandering of the rope 80-82 during production. Basically, a larger sized rope will wander less, resulting in less variation in the products produced but with the produced products having additional crimped and cut sides. In any case, it should be readily apparent that this single crimping and cutting assembly design can be employed to produce a wide range of differently shaped and sized, completely sealed internally filled food products with between two and six crimped and cut sides.

Although the rope can wander laterally relative to the first and second rollers while being continually crimped and cut at longitudinally spaced locations to create different sized and polygonal-shaped, internally filled dough products, the forces acting on a given rope by the respective crimping and cutting members automatically causes general realigning of the rope with the crimping and cutting members in a certain region, e.g., first end portions, central portions and opposing end portions of the two rollers based on the example of three extruded ropes, during rotation of the rollers. In this sense, there is a limited or controlled degree of swaying or wandering of the ropes. Importantly, it has been found that the ropes are consistently, cleanly crimped and cut with this assembly such that the invention can be employed in a high speed manufacturing setting without the ropes being damaged during crimping and cutting, i.e., the food products remain completely sealed. In addition, the ability to make varying sized and shaped products with a common crimping and cutting assembly is quite advantageous.

Although described with reference to preferred embodiments of the invention, it should be understood that various changes and/or modifications can be made to the invention without departing from the spirit thereof. For instance, although a hexagonal pattern has been represented for the crimping and cutting members, other geometric patterns, such as diamond-shaped and even non-uniform polygonal patterns, across the second roller could be employed. In addition, as shown, each rope can be directed to a full or partial hexagonal or other geometrically shaped, interconnected crimping and cutting members. Furthermore, the first roller need not necessarily be smooth. Instead, first roller could mirror the second roller such that the various crimping and cutting members are aligned. This arrangement enables the various upstanding walls to be reduced in height, basically in half, while still establishing the same sized cell region for partially housing the produced products prior to ejection onto the second conveyor. The first roller could also mimic the second roller in construction but without the cutting bead. Finally, it should be noted that the cutting bead need not fully cut or sever the rope, such that cutting the rope in accordance with the invention only requires that the rope be partially cut. Therefore, a blunt or even undulating bead can be employed to only partially sever or cut the rope, e.g., forming a line of perforations or thin separation line of demarcation, thereby resulting in varying shaped food products which are interconnected and can be handled or even sold as a string of such food products.

I claim:

1. A method of crimping and cutting dough products comprising:
   extruding at least one rope including an outer dough casing and an internal filling material in a first axial direction along a conveyor; and
   directing the at least one rope to a rotating crimping and cutting assembly including a first roller in combination with a second roller including various interconnected crimping and cutting members wherein, upon passing the at least one rope between the first and second rollers, the at least one rope wanders laterally relative to at least the second roller while being continually crimped and cut at longitudinally spaced locations to create different sized and polygonal-shaped, internally filled dough products.

2. The method of claim 1, wherein the first roller has a smooth external surface and the crimping and cutting members are arranged in a honeycomb pattern about an external surface of the second roller.

3. The method of claim 1, further comprising: automatically realigning the at least one rope with the crimping and cutting members with rotation of the first and second rollers.

4. The method of claim 1 wherein, during continued rotation of the crimping and cutting assembly, the at least one rope is crimped and cut into both internally filled dough products having three sides and internally filled dough products having more than three sides.

5. The method of claim 1, further comprising:
   extruding at least three ropes onto the conveyor in various transversely spaced rows of filled dough; and
   simultaneously crimping and cutting each of the rows of filled dough by the crimping and cutting assembly by directed the at least three ropes between the first and second rollers.

6. A method of crimping and cutting dough products comprising:
   extruding at least one rope including an outer dough casing and an internal filling material in a first axial direction along a conveyor;
   directing the at least one rope to a crimping and cutting assembly including a first roller in combination with a second roller including a honeycomb pattern of combination crimping and cutting members, wherein the first and second rollers are rotated and, upon passing between the first and second rollers, the at least one rope is continually crimped and cut at longitudinally spaced locations to continuously create polygonal-shaped, internally filled dough products having a varying number of sides with each product having between two and six crimped and cut sides; and permitting the at least one rope to wander laterally relative to the crimping and cutting assembly as the first and second rollers are rotated, wherein the dough products are produced in varying sizes and shapes.

7. The method of claim 6, wherein the first roller has a smooth external surface and the combination crimping and cutting members are arranged in a hexagonal honeycomb pattern about an external surface of the second roller.

8. The method of claim 6, further comprising:

automatically aligning the at least one rope with the combination crimping and cutting members with rotation of the first and second rollers.

9. The method of claim 6 wherein, during continued operation of the crimping and cutting assembly, the at least one rope is crimped and cut into internally filled dough products which vary in size and shape.

10. The method of claim 9, wherein the internally filled dough products include both internally filled dough products having three sides and internally filled dough products having more than three sides.

11. The method of claim 6, further comprising:

extruding at least three ropes onto the conveyor in various transversely spaced rows of filled dough; and simultaneously crimping and cutting each of the rows of filled dough by the crimping and cutting assembly by directed the at least three ropes between the first and second rollers.

12. The method of claim 11, wherein the at least three ropes shift or wander laterally during production, resulting in slightly different size or shape food products.

13. A combination crimping and cutting apparatus comprising:

a crimping and cutting assembly including a first roller in engagement with a second roller including a honeycomb pattern of combination crimping and cutting members; and a conveyor configured to direct at least one rope, including an outer dough casing and an internal filling material, between the first and second rollers whereupon the at least one rope wanders laterally relative to the crimping and cutting assembly as the first and second rollers are rotated and is continually crimped and cut at longitudinally spaced locations to continuously create polygonal-shaped, internally filled dough products, in varying sizes and shapes, having a varying number of sides with each product having between two and six crimped and cut sides.

14. The combination crimping and cutting apparatus according to claim 13, wherein the first roller has a smooth external surface and the combination crimping and cutting members are mainly arranged in a closed cell pattern about an external surface of the second roller.

15. The combination crimping and cutting apparatus according to claim 14, wherein the combination crimping and cutting members are arranged in a hexagonal honeycomb pattern about the external surface of the second roller.

16. The combination crimping and cutting apparatus according to claim 13, further comprising: an extruder for co-extruding the at least one rope with an outer dough casing and an internal filling material.

17. The combination crimping and cutting apparatus according to claim 13, wherein each of the crimping and cutting members includes a plurality of interconnected upstanding walls leading to an upper ledge, and at least one cutting element projecting from the upper ledge.

18. The combination crimping and cutting apparatus according to claim 17, wherein the plurality of upstanding walls are interconnected in a honeycomb pattern.

19. The combination crimping and cutting apparatus according to claim 17, wherein the at least one cutting element constitutes a bead extending about the plurality of interconnected upstanding walls and wherein both the upper ledge and the bead is common to multiple ones of the crimping and cutting members.

* * * * *